United States Patent
Jain et al.

(10) Patent No.: US 11,461,082 B2
(45) Date of Patent: Oct. 4, 2022

(54) SYSTEMS AND METHODS FOR MANAGING RELEASES OF GLOBAL SERVICES IN A CONTROLLED MANNER

(71) Applicant: Citrix Systems, Inc., Fort Lauderdale, FL (US)

(72) Inventors: Ayush Jain, North Lauderdale, FL (US); Steven A. Keller, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 124 days.

(21) Appl. No.: 16/053,563

(22) Filed: Aug. 2, 2018

(65) Prior Publication Data

US 2020/0042298 A1 Feb. 6, 2020

(51) Int. Cl.
| | |
|---|---|
| *G06F 8/60* | (2018.01) |
| *G06F 8/71* | (2018.01) |
| *G06F 11/36* | (2006.01) |
| *G06F 11/14* | (2006.01) |
| *G06F 21/53* | (2013.01) |

(52) U.S. Cl.
CPC .................. *G06F 8/60* (2013.01); *G06F 8/71* (2013.01); *G06F 11/1433* (2013.01); *G06F 11/1484* (2013.01); *G06F 11/3664* (2013.01); *G06F 11/3672* (2013.01); *G06F 21/53* (2013.01)

(58) Field of Classification Search
CPC ...................................... G06F 8/71; G06F 8/60
USPC ......................................................... 717/175
See application file for complete search history.

(56) References Cited

U.S. PATENT DOCUMENTS

| | | | | |
|---|---|---|---|---|
| 7,818,735 | B1* | 10/2010 | Vook | G06F 8/65 |
| | | | | 713/182 |
| 10,402,191 | B1* | 9/2019 | Eapen | G06F 9/44536 |
| 2007/0100513 | A1* | 5/2007 | Asano | G08G 1/0104 |
| | | | | 701/2 |
| 2008/0127086 | A1* | 5/2008 | Sattler | G06F 8/71 |
| | | | | 717/121 |
| 2017/0075663 | A1* | 3/2017 | Jordan | G06F 8/38 |
| 2018/0309623 | A1* | 10/2018 | Szobi | H04L 41/082 |
| 2018/0322038 | A1* | 11/2018 | Thazhathekalam | |
| | | | | G06F 11/3696 |
| 2018/0329931 | A1* | 11/2018 | Baid | G06F 9/547 |
| 2019/0065179 | A1* | 2/2019 | Novak | G06F 8/71 |
| 2019/0222638 | A1* | 7/2019 | Keller | H04L 41/5051 |
| 2019/0230189 | A1* | 7/2019 | Keller | H04L 67/32 |

(Continued)

*Primary Examiner* — Lewis A Bullock, Jr.
*Assistant Examiner* — Theodore E Hebert
(74) *Attorney, Agent, or Firm* — Foley & Lardner LLP

(57) ABSTRACT

Described herein are systems and methods for managing releases of global services in a controlled manner. A computing environment may include a first release of a global service, a second release of the global service, and a manager service. The first and second release may be enabled and disabled. The first release may be enabled and the second release may be disabled. The second release may be ready for use in the computing environment after passing one or more checks. A manager service may enable use of the second release in the computing environment. The manager service may disable use of (but maintain execution of) the first release in the computing environment. The second release may be determined to have one or more issues. Responsive to determining the second release has issue(s), the manager service may disable use of the second release and re-enable use of the first release.

21 Claims, 9 Drawing Sheets

(56) References Cited

U.S. PATENT DOCUMENTS

2019/0250951 A1\* 8/2019 Brandwine ........... G06F 9/5077
2019/0278691 A1\* 9/2019 Ramalingam ............. G06F 8/71

\* cited by examiner

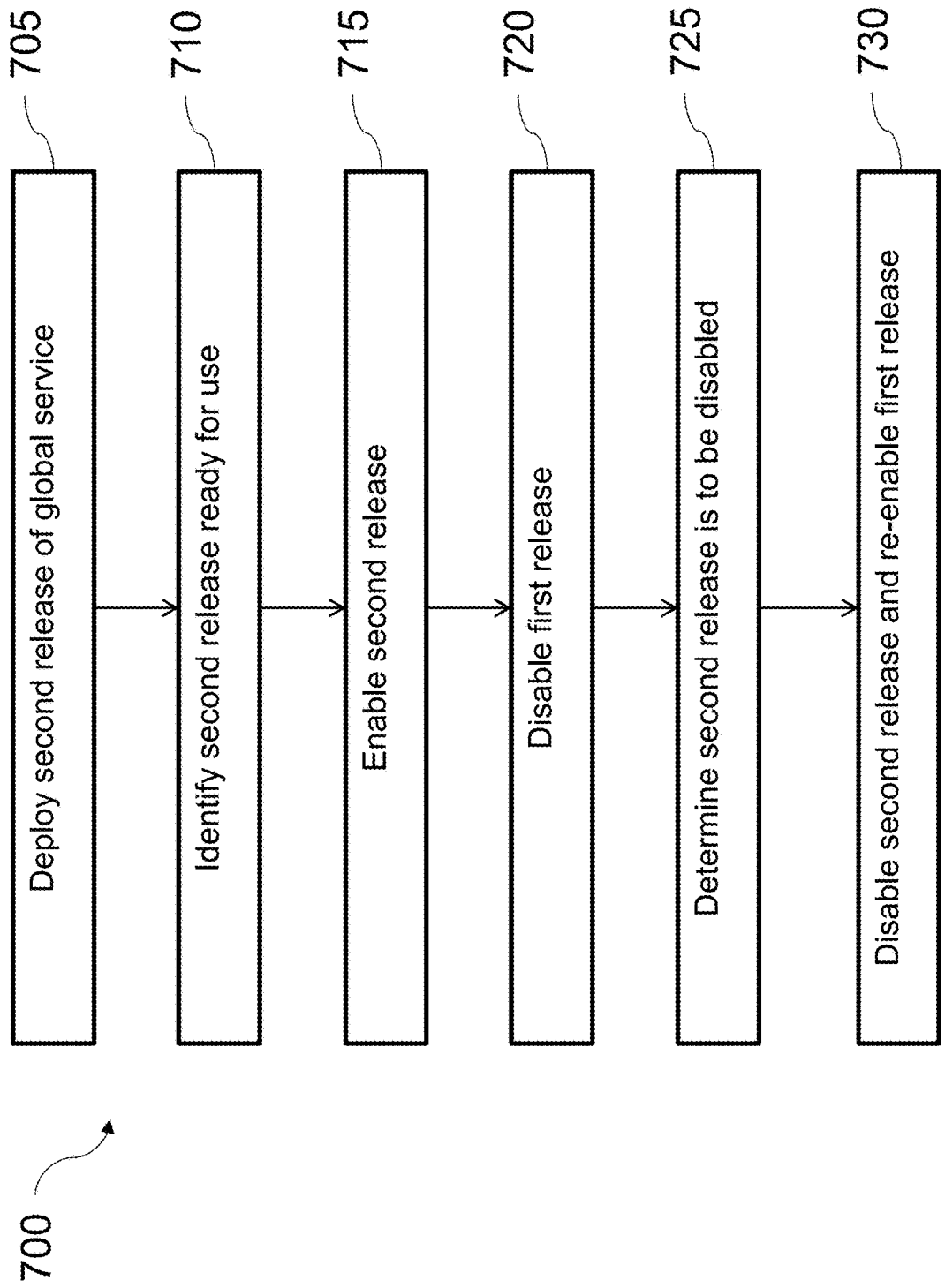

SYSTEMS AND METHODS FOR MANAGING RELEASES OF GLOBAL SERVICES IN A CONTROLLED MANNER

FIELD OF THE DISCLOSURE

The present application generally relates to deployment of new software code, including but not limited to systems and methods for managing releases of global services in a controlled manner.

BACKGROUND

Alpha/Beta (AB) testing is a tool which allows for rollout of new code in a controlled and reliable manner. Deployment failures of the new code may result in downtime. To address the deployment failures, systems generally are rolled back to an older version of the code.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

In one aspect, the present disclosure is directed to a method for managing releases of global services in a controlled manner. The method may include deploying in a computing environment a second release of a global service in a disabled state. The computing environment may include a first release of the global service which is enabled and in use. Each of the first release of the global service and the second release of the global service may be configured to be enabled and disabled. The method may include identifying that the second release of the global service has passed one or more checks and is ready to be enabled for use in the computing environment. The method may include enabling, by a manager service, use of the second release of the global service in the computing environment. The method may include disabling, by the manager service, use of the first release of the global service in the computing environment while maintaining execution of the first release of the global service in the computing environment. The method may include determining that the second release of the global service has one or more issues and is to be disabled. The method may include disabling, by the manager service, use of the second release of the global service in the computing environment and re-enabling use of the first release of the global service.

In some embodiments, the computing environment includes a cloud based computing environment. In some embodiments, the second release of the global service includes one of maintenance fixes or enhancements to the first release of the global service. In some embodiments, one of the first release of the global service and the second release of the global service is not configured to receive any application programming interface (API) calls other than from the manager service.

In some embodiments, the method further includes registering, by one of the first release of the global service or the second release of the global service, with the manager service. In some embodiments, the method further includes polling, by the first release of the global service or the second release of the global service, the manager service for one of an enable or disable command.

In some embodiments, disabling use of the second release of the global service in the computing environment and re-enabling use of the first release of the global service further comprises maintaining the disabled second release of the global service executing and idle in the computing environment. In some embodiments, one or more non-global services executing in the computing environment continue to process user requests received when the first release of the global service was enabled.

In some embodiments, determining that the second release of the global service has one or more issues and is to be disabled further includes determining that the global service is to be rolled back to the first release of the global service from the second release of the global service. In some embodiments, the manager service disables the first release of the global service responsive to enabling the second release of the global service.

In another aspect, the present disclosure is directed to a system for managing releases of global services in a controlled manner. The system may include a computing environment including a first release of a global service and a second release of the global service. Each of the first release of the global service and the second release of the global service may be configured to be enabled and disabled. The first release of the global service may be enabled and in use and the second release of the global service is disabled. The second release of the global service may be configured to be ready to be enabled for use in the computing environment responsive to passing one or more checks. The system may include a manager service executable in the computing environment. The manager service may be configured to enable use of the second release of the global service in the computing environment and disable use of the first release of the global service in the computing environment. Execution of the first release of the global service may be maintained in the computing environment. The second release of the global service may be determined to have one or more issues. The manager service may be configured to disable use of the second release of the global service in the computing environment and re-enable use of the first release of the global service.

In some embodiments, the computing environment includes a cloud based computing environment. In some embodiments, the second release of the global service includes one of maintenance fixes or enhancements to the first release of the global service. In some embodiments, one of the first release of the global service and the second release of the global service is not configured to receive any application programming interface (API) calls other than from the manager service.

In some embodiments, one of the first release of the global service or the second release of the global service is further configured to register with the manager service. In some embodiments, one of the first release of the global service or the second release of the global service is further configured to loop poll the manager service for one of an enable or disable command.

In some embodiments, the disabled second release of the global service is maintained executing and idle in the computing environment. In some embodiments, one or more non-global services are configured in the computing environment to continue to process user requests received when the first release of the global service was enabled.

In some embodiments, the manager service is further configured to rollback the global service to the first release from the second release. In some embodiments, the manager service is further configured to disable the first release of the global service responsive to enabling the second release of the global service.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 7 is a flow diagram of one example embodiment of a method for managing releases of global services in a controlled manner.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for managing releases of global services in a controlled manner.

A. Network and Computing Environment

Figure 1A:
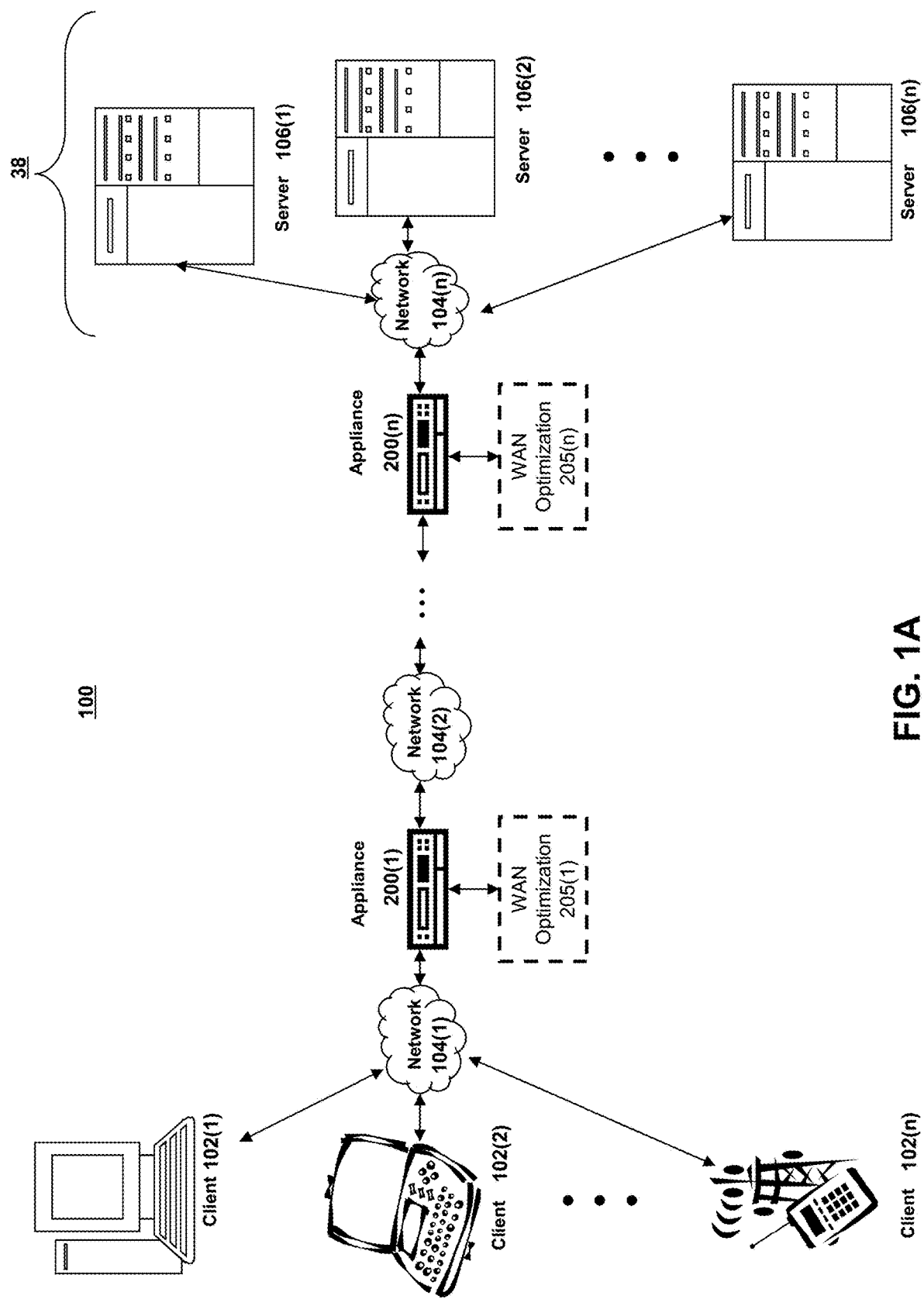
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc. of Fort Lauderdale, Fla.

Figure 1B:
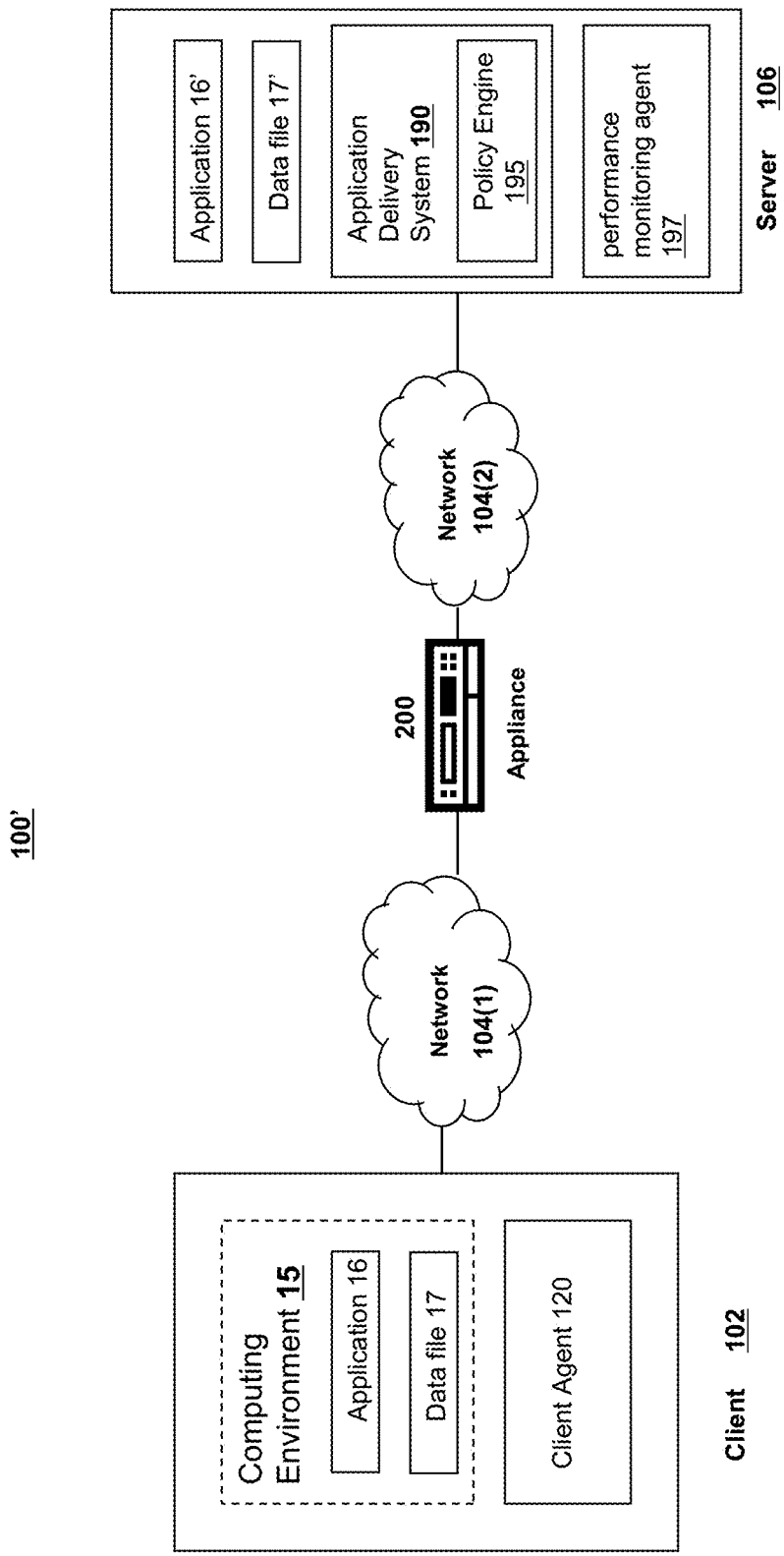
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
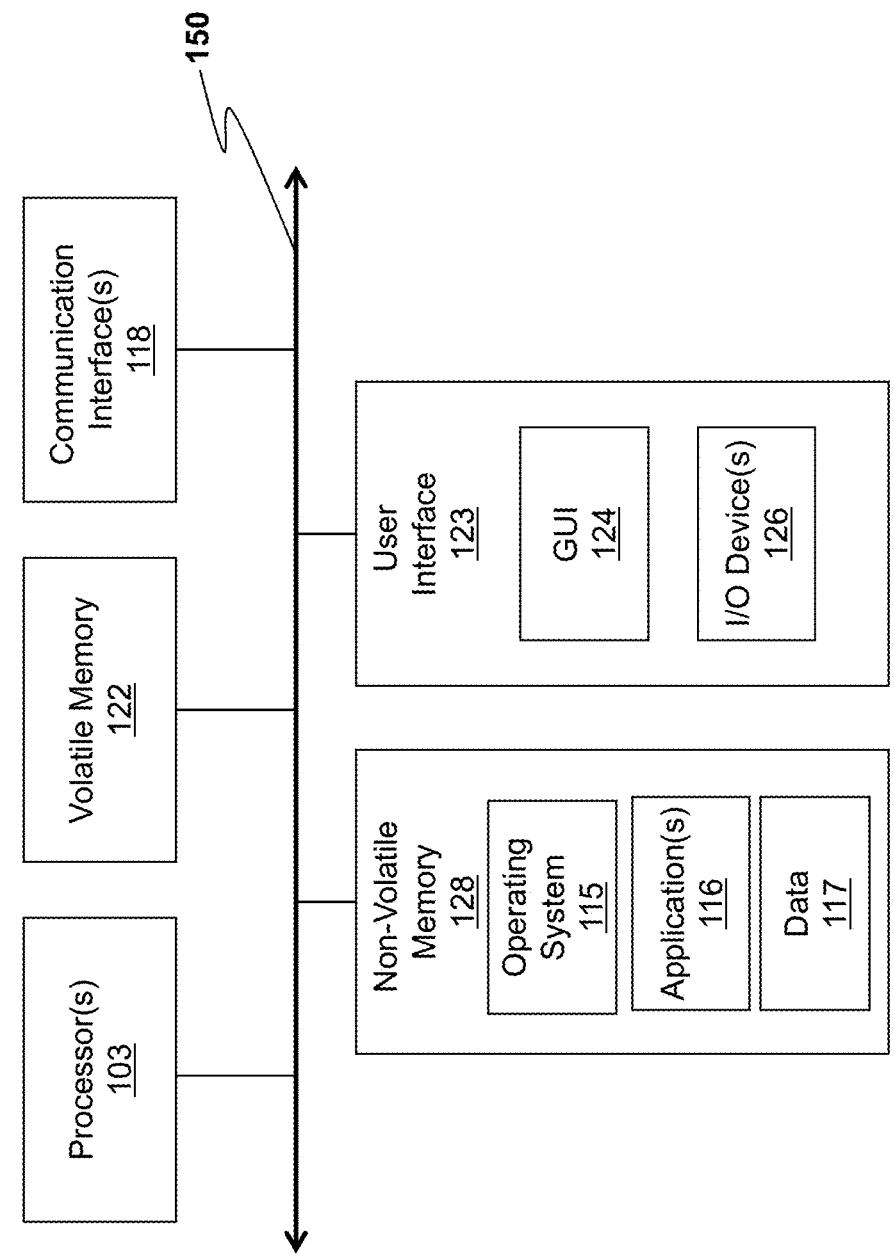
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
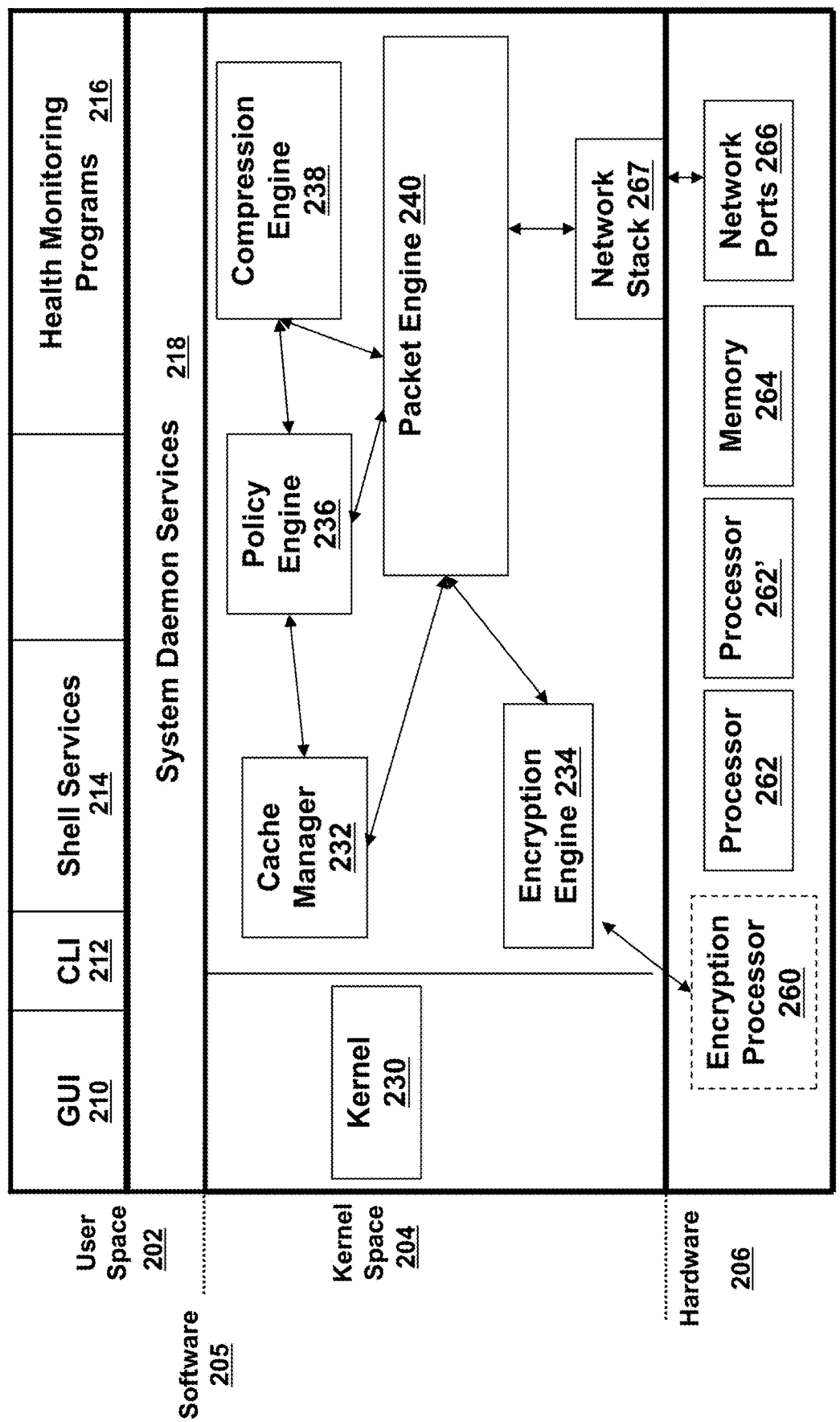
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
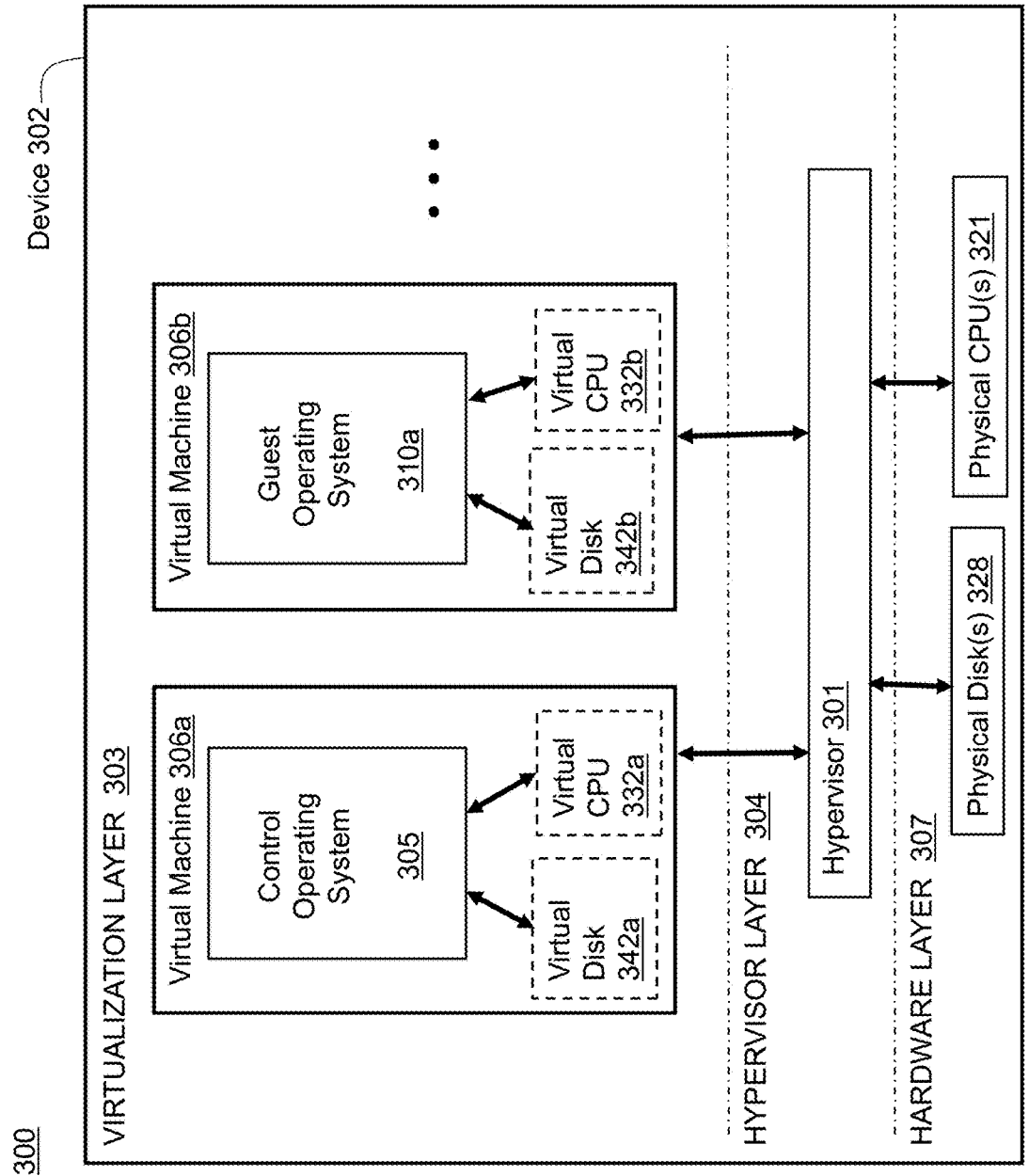
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
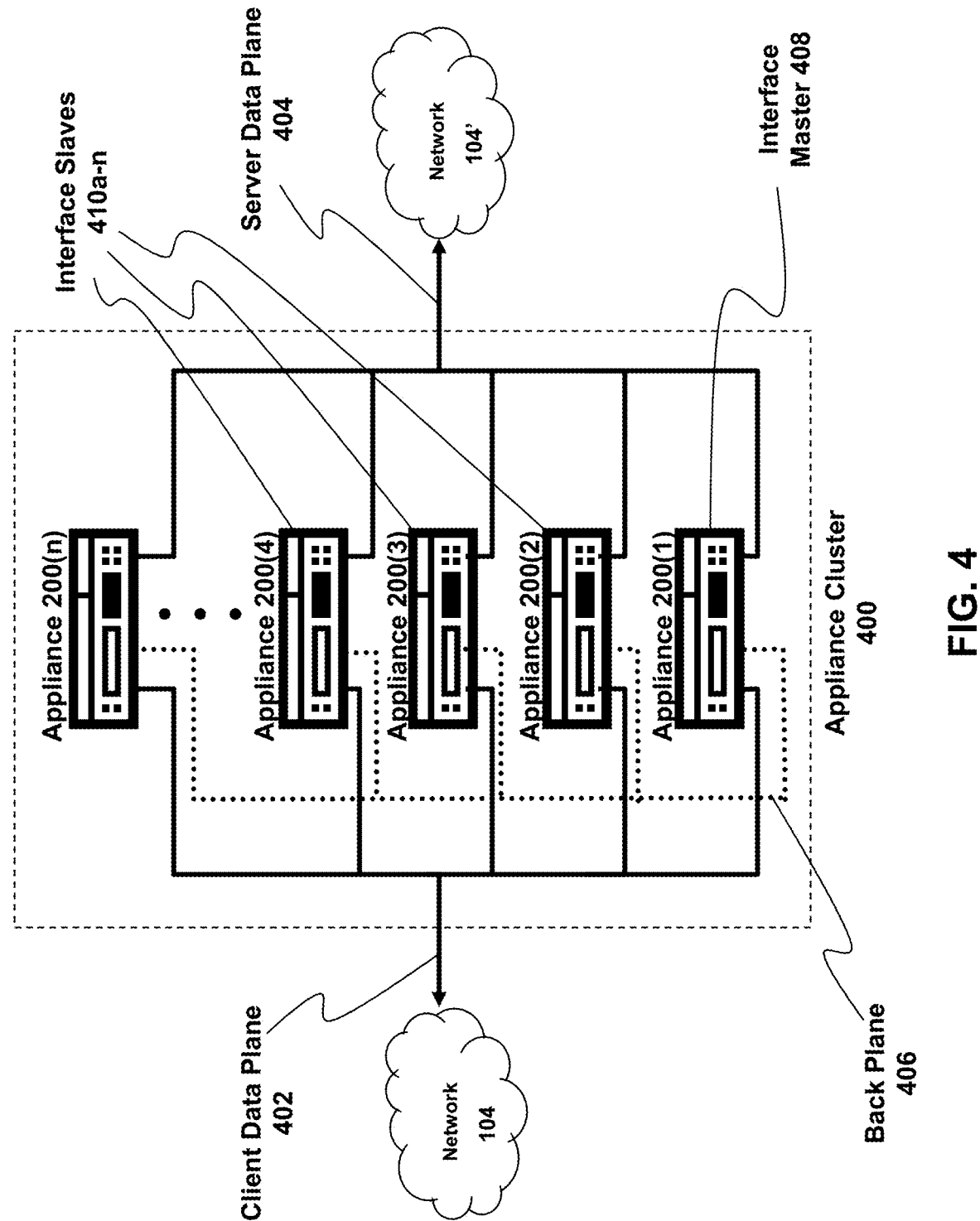
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Managing Releases of Global Services in a Controlled Manner The embodiments described herein are directed to systems and methods for managing releases of global services in a controlled manner. A computing environment (such as the Citrix Cloud computing environment) may include a first release of a global service and a second release of a global service. The first release and second release may be configured to be enabled and disabled. At the outset, the first release of the global service may be enabled and the second release of the global service may be disabled. The second release of the global service may be configured to be ready for use in the computing environment following the second release passing one or more checks. A manager service executable in the computing environment may be configured to enable use of the second release of the global service in the computing environment. The manager service may further be configured to disable use of the first release of the global service in the computing environment. Execution of the first release of the global service may be maintained in the computing environment. The second release of the global service may be determined to have one or more issues. Responsive to determining that the second release of the global service has one or more issues, the manager service may be configured to disable use of the second release of the global service and re-enable use of the first release of the global service.

Global services in a cloud-based computing environment (such as the Citrix Cloud) currently replace existing code executing in the cloud-based environment with new code for execution. According to the embodiments described herein, two releases of code may be maintained in the computing environment at the same time—one release executing in a running state, and another release executing in a dormant state. Current solutions do not provide for rollback to previous versions of code in instances of coding issues. Since the existing solutions run only one release of code at a time, where issues with the code occur (such as startup failures, deployment failures, or anything that forces the global services to go in a bad state), rollout of repairs may cause downtime. The systems and methods presented herein allow for rollback to previous versions in instances of coding issues. The new service is started in a dormant state, and does not affect the running of the existing service.

Alpha/Beta (A/B) testing is a tool which allows for rollout of new code in a controlled and reliable manner. Customers are gradually exposed to new code, and can be moved back to old code in instances of errors or code failures. This type of controlled rollout provides for two separate pieces of code executing at the same time and actively servicing customers at the same time.

In some instances, a service should exist globally as consumers are not directly exposed to that code. An example of such services would be worker services that run in the background. The services cannot be rolled out in a controlled way since they are not exposed to consumers directly. In such cases, in a cloud-based computing environment, code for the existing service is replaced with new code, which ideally properly executes in the first instance. However, in instances of deployment failures, such deployment failures may result in downtime. In most instances, rollback to the older version of code is performed by redeploying the code for the existing services to replace the new code, which may cause downtime and/or running erroneous code for an extended duration.

The embodiments described herein may improve the reliability of releasing global services (including global workers) by enabling A/B type release cycles. The embodiments described herein enable a dynamic switch between a new release of code and provide for fallback to a previous release of code. According to the embodiments described herein, global services are services that do not have any Application Programming Interface (API) or external Domain Name System (DNS). Rather, global services are designed or configured to do timed work. For example, global services may generate reports every hour, may read a queue and perform a task based on the item in the queue, etc.

The disclosed systems and methods provide for A/B type release cycles for global services. New global services are deployed side-by-side with the old instance of the service. Following release and publication of the new global services, the new global services are idle and thus do not serve any requests or perform any tasks. The old instance of the global service continues to function independently (e.g., the old instance of the global service serves the requests and performs corresponding tasks). Following various testing and checks on the new global services, the new global services may be enabled.

The global services may be controlled by an API service (referred to herein as manager service). The manager service may provide commands to enable or disable various global services within the cloud computing environment (such as the Citrix Cloud). The global services may poll the manager service for commands to enable or disable. Such embodiments may provide for dynamic switching between an enabled state and disabled state. For instance, a first and second release for various global services may be provided in the cloud computing environment. The first release may be "old" code (e.g., a first version), and the second release may be "new" code (e.g., a second version). The second release may be maintained in a dormant state, while the first release may be in an active, running state. In some embodiments, some customers may be serviced by non-global services, which may be provided in both the first and second release. Following deployment of the new code (e.g., in the second release), the manager service may be called to enable the new code (e.g., global services in the second release) and disable the old code (e.g., global services in the first release). Such a call may be initiated following various testing of the second release. The order of enabling and disabling may be modified, changed, adapted, etc. according to the nature of the product being deployed. Following all testing, the end result may include all global services in the second release in an enabled state (e.g., where all global services in the second release are in an active, running state), and all the global services in the first release in a disabled state (e.g., where all global services in the first release are in a dormant state).

Figure 5:
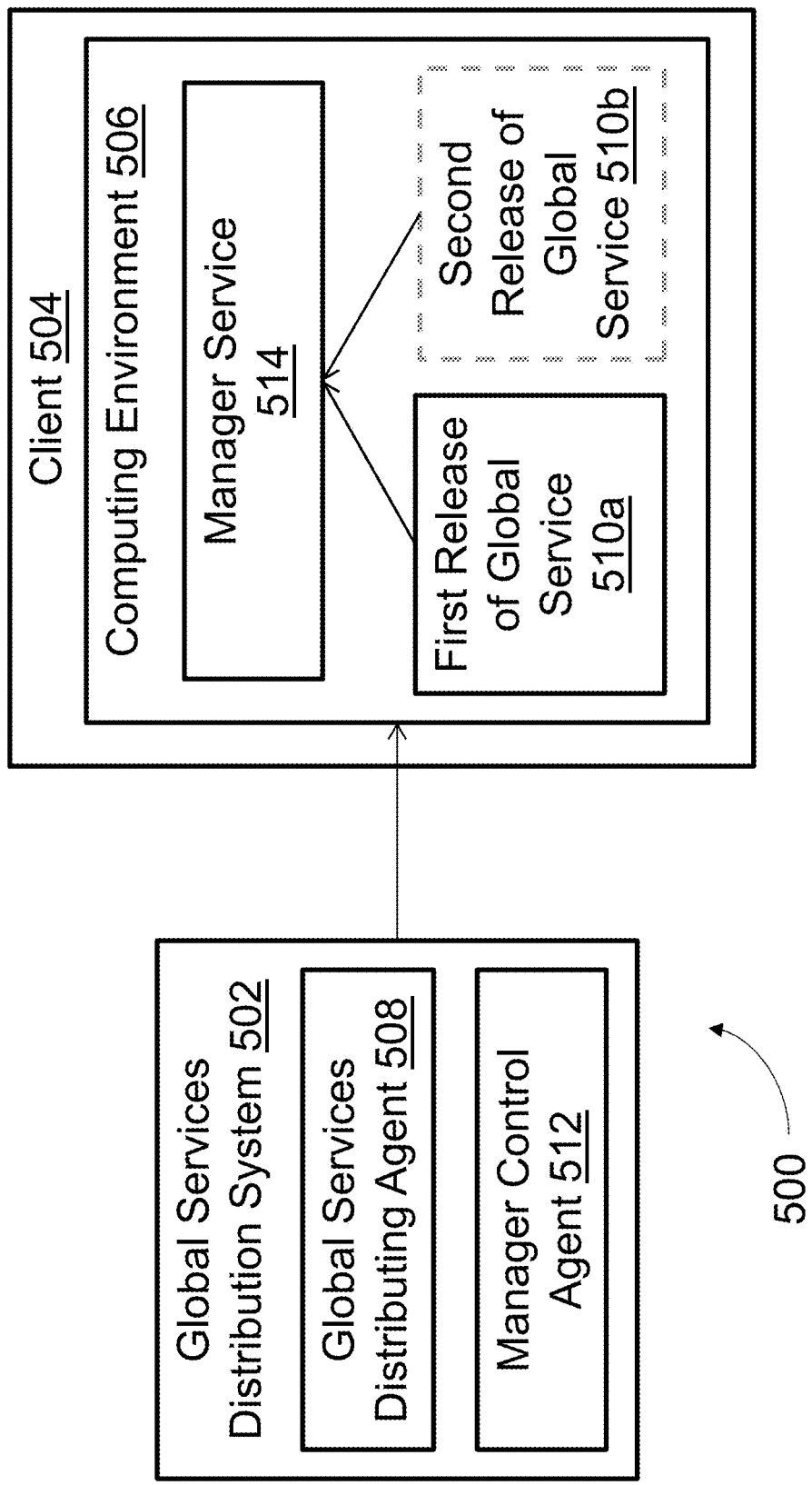
FIG. 5 is a block diagram of one embodiment of a system for managing releases of global services in a controlled manner.

Referring to FIG. 5, depicted is a block diagram of one embodiment of a system 500 for managing releases of global services in a controlled manner. The system 500 can include a global services distribution system 502 communicably coupled to a client 504 executing, controlling, operating, or otherwise providing a computing environment 506. The global services distribution system 502 may include a global services distributing agent 508. The global services distributing agent 508 may provide, provision, communicate, or otherwise deploy a first release of a global service 510a and a second release of the global service 510b to the client 504. The first and second release of the global service 510a, 510b may be maintained, provided in, located on, contained in, or otherwise deployed in the computing environment 506. In some embodiments, the global services distribution system 502 may include a manager control agent 512. The manager control agent 512 may be configured to control a manager service 514 executing in the computing environment. The manager service 514 may be designed, configured or implemented to control a state of the first and second release of the global service 510a, 510b. The manager control agent 512 may communicate signals, instructions, code, etc. to the manager service 514 for selectively enabling the first release of the global service 510a and disabling the second release of the global service 510b. The manager control agent 512 may control the manager service 514 to communicate commands for disabling the second release of the global service 510b while the second release 510b is subject to testing and evaluation. The manager control agent 512 may control the manger service 514 to communicate commands for enabling the first release of the global service 510a while the second release 510b is subject to testing and evaluation such that one instance of the global service (510a in this example) is active and running in the computing environment. Following the second release 510b being tested and evaluated, the manager control agent 512 may control the manager service 514 to communicate an enable command to enable the second release 510b and to communicate an enable command to disable the first release 510a.

Each of the above-mentioned elements or entities is implemented in hardware, or a combination of hardware and software, in one or more embodiments. Each component of the system 500 may be implemented using hardware or a combination of hardware or software detailed above in connection with FIG. 1A-FIG. 1C. For instance, each of these elements or entities can include any application, program, library, script, task, service, process or any type and form of executable instructions executing on hardware of the client device 506 or the global services distribution system 500 for example. The hardware includes circuitry such as one or more processors in one or more embodiments.

The global services distribution system 502 may be a server, computer, computing system, etc. configured to distribute, disburse, provide, or otherwise load software to various computing environment. The global services distribution system 502 may include one or more of the computing components described above with reference to FIG. 1A-FIG. 1C (e.g., one or more processor(s) 103, volatile or non-volatile memory 122, 128, communications interface(s) 118). Hence, the global services distribution system 502 may include aspects similar to the computer 101 described above.

The global services distribution system 502 may be designed, configured or implemented to store, retain, or otherwise include software. Such software may be provided to the global services distribution system 502 by developers using, for instance, communications bus 150 (of FIG. 1C). Software developers may code, compile, and release the software to the global services distribution system 502. The global services distribution system 502 may receive the code from the software developers. The global services distribution system 502 may be configured to distribute the software to one or more clients 504, as discussed in greater detail below.

In some embodiments, the software included in the global services distribution system 502 may include one or more global service(s). Global services may be or include background services executing in a computing environment which is universal to all clients executing the computing environment. In some embodiments, global services may be designed or configured to do timed work. For instance, global services may generate reports every hour, may read a queue and perform a task based on the item in the queue, etc. Global services may execute in the background. Hence, global services may have limited to no customer interaction. In some embodiments, global services may not interface with any other external services. Hence, global services may not include any (or are independent of any) application programming interface (API) or external Domain Name System (DNS).

The global services distribution system 502 may include a global services distributing agent 508. The global services distributing agent 508 may be designed, configured or implemented to install, provide, communicate, deliver, or otherwise deploy one or more global services to clients 506. The global services distributing agent 508 may deliver the global service(s) to clients 506 when, for instance, the global service(s) are provided to the global services distribution system 502 (e.g., by the software developers), at a scheduled time, etc.

The global services distribution system 502 may establish a connection with the client(s) 506 for delivering the global service(s) to the client(s) 506. In some embodiments, the global services distribution system 502 (or client 506) may include a networking agent. The networking agent may establish, create, generate, or otherwise form one or more connections between the global services distribution system 502 and the client 506.

The networking agent is sometimes referred to as an SD-WAN agent, mVPN agent, or microVPN agent. The networking agent can establish or facilitate establishment of a network connection between the client 506 and the global services distribution system 502 (which hosts, includes, stores, etc. the global services to be delivered to the client 506). The networking agent can perform handshaking for a requested connection from the client 506, and can establish the requested connection. In some embodiments, the networking agent may establish a secure or encrypted connection. For instance, the networking agent may connect to enterprise resources (including services and network applications) for instance via a virtual private network (VPN). For example, the networking agent can establish a secure socket layer (SSL) VPN between the client 506 and global services distribution system, which can support remote delivery or provisioning of one or more global service(s). The VPN connections, sometimes referred to as microVPN or application-specific VPN, may be specific to particular computing environments, particular clients, etc. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

In some embodiments, the networking agent may be designed, configured or implemented to form an HTTP or web-based session with the global services distribution system 502. The networking agent may establish a transmission control protocol (TCP) connection to, for instance, a server of the global services distribution system 502 (e.g., a port of the server). The networking agent can exchange various commands with the server within the HTTP session in accordance with TCP. In some embodiments, the networking agent may establish a secure HTTP (e.g., HTTPS) session in a manner similar to the secure connections described above.

In these embodiments, the networking agent can form or establish the network connection between the global services distribution system 502 and the client(s) 504. In some embodiments, the networking agent may form or establish a secure connection (e.g., SSL VPN connection) between the global services distribution system 502 and the client(s) 504.

The global services distribution system 502 may be designed, configured or implemented to initiate a provisioning session to deliver the software to the client(s) 504 (e.g., including the global services). The global services distribution system 502 may initiate the provisioning session within or across the network connection established by the networking agent. In some embodiments, a remote session agent may initiate the provisioning session (e.g., which may be established using Citrix high definition user experience (HDX) or independent computing architecture (ICA) protocol, or remote desktop protocol (RDP)). The remote session agent may initiate the provisioning session in accordance with any type or form of protocols, such as RDP, Appliance Link Protocol (ALP), Remote Frame Buffer (RFB) Protocol, and ICA Protocol. Such protocols can allow delivery of software that is natively hosted at the global services distribution system 502 to be communicated to the client 504.

The global services distributing agent 508 may communicate, deliver, distribute, provide, or otherwise deploy the global services across the network connection established by the global services distribution system (e.g., the networking agent). In some embodiments, the global services distributing agent 508 may deploy a first release of a global service 510a and a second release of the global service 510b. "Release," as used herein, refers to an iteration, instance, version, etc. of a global service. In some embodiments, the first release 510a may be released (or deployed to the client 504) prior to the second release 510b. Hence, the first release 510a may be the first instance or iteration of the global service, and the second release 510b may be the second instance or iteration of the same global service. In some embodiments, the first release 510a and second release 510b may be deployed side-by-side (e.g., the first and second releases 510a, 510b may be deployed at the same time). In both embodiments, the first release 510a and second release 510b may both be implemented in, located, contained, or otherwise deployed and configured to execute within the computing environment 506 (e.g., of the client 504). The second release 510b may be or include one or more enhancements, improvements, and/or bug fixes with respect to the first release 510a. Various software developers may modify one or more aspects of the first release 510a to form the second release 510b. The software developers may modify the first release 510a in response to user feedback, crash or force close reports, error reports, latency issues, etc. The second release 510b may address the one or more aspects or issues identified within the first release 510a. In some embodiments, the second release 510b may provide for improved functionality which was previously unavailable in the first release 510a.

In some embodiments, the second release 510b may be subject to Alpha/Beta (AB) testing. The A-testing may occur in-house (e.g., by the software developers). The B-testing may occur by, for instance, a subset of clients 504. The first release and the second release 510a, 510b may both be maintained within the computing environment 506. In some embodiments, the second release 510b may be selectively enabled on the subset of clients 504 for testing. When enabled, the second release 510b may be in an active, running state such the second release of the global service 510b may service requests for a client 504, perform various functions, or otherwise act independently of the disabled global service 510. The first release 510a may be disabled for the subset of clients 504 such that one release (e.g., the second release 510b) is executing in the computing environment 506 for the subset of clients 504. When disabled, the first release 510a may be in an idle, dormant state such that the first release of the global service 510a may execute within the computing environment 506, but otherwise not service any requests or perform any functions for the client 504. The computing environment 506 for the remaining clients 504 in the network may execute the first release 510a (hence, the first release 510a may be enabled for the remaining clients 504). Following testing and other checks of the second release 510b, the second release 510b may be enabled for all clients 504, and the first release 510a may be disabled for all clients 504.

The system 500 may include one or more client(s) 504. In some embodiments, the client(s) 504 may include aspects similar to clients 102 described above with reference to FIGS. 1A-1B. For instance, client(s) 504 may be or include one or more devices used by a user for connecting to one or more network resources. In some embodiments, the client(s) 504 may execute a computing environment 506. The computing environment 506 may be similar in some aspects to computing environment 15 described above in at least FIG. 1B. The computing environment 506 may execute or operate various applications which may access, process, or otherwise use various data files. In some embodiments, the computing environment 506 may be delivered to the client 504 across the network connection established by the global services distribution system 502 (or similar network connection and provisioning session). Hence, in some embodiments, the computing environment 506 may be a cloud-based computing environment. In some embodiments, the computing environment 506 may execute wholly on or within the client 504 (e.g., the computing environment 506 may be a local computing environment).

The client(s) 504 may receive the global service(s) from the global services distribution system 502. In some embodiments, the client(s) 504 may receive the global service(s) when the computing environment is delivered to the client 504. For instance, the client(s) 504 may receive the global service(s) across the same channel of the remote delivery session as the channel in which the cloud-based computing environment is delivered. In still some embodiments, the client(s) 504 may receive the global services separate from the computing environment 506. The client(s) 504 may receive the global service(s) across a different channel of the remote delivery session (or across a different remote delivery session) with respect to the channel in which the cloud-based computing environment is delivered. The client(s) 504 may receive the global service(s) as a packet, which may be a downloadable update. In each of these embodiments, the global service(s) may be executed within the computing environment 506, which may be a cloud-based computing environment 506 or a local computing environment 506.

In some embodiments, the client(s) 504 may receive global and non-global services. Non-global services may be or include services executing in a computing environment which may be specific to a particular client or subset of clients. In some embodiments, non-global services may execute in the background (e.g., similar to global services). In some embodiments, non-global services may execute in the foreground (e.g., some non-global service(s) may include various user interface aspects and designed to interact with a user). Non-global service(s) may be designed, configured or implemented to execute and process user requests without regard to the status of global service(s). Hence, non-global service(s) may operate or are configured to operate independently of global services. In some embodiments, non-global service(s) may be or include local services (e.g., services which may execute locally outside of the computing environment, or services which may execute within the computing environment but specific to particular clients or client requirements within a given client network).

As described above, the global services received by the client 504 may execute, be downloaded/installed, or otherwise be included in or deployed within the computing environment 506. In some embodiments, the computing environment 506 may include a first release of a global service 510a and a second release of a global service 510b.

In some embodiments, the computing environment 506 may switch between executing the first release of a global service 510a and executing the second release of the global service 510b. The computing environment 506 may include a manager service 514. The manager service 514 may be configured to selectively enable the first release 510a and second release 510b. The manager service 514 may enable the second release 510b and, in response to enabling the second release 510b, disable the first release. Hence, the manager service 514 may maintain one of the releases of the global services 510a, 510b in an enabled state. In the enabled state, the global services 510 may service requests for a client 504, perform various functions, or otherwise act independently of the disabled global service 510. In the disabled state, the global service(s) 510 may execute within the computing environment 506, but otherwise not service any requests or perform any functions. Hence, in the disabled state, the global service 510 may be dormant (or inactive), whereas, in the enabled state, the global service 510 may be in an active (e.g., running) state. Both releases 510a, 510b may be switched between enabled and disabled state according to various inputs and/or detected conditions.

In some embodiments, the first and/or second release 510a, 510b may register with the manager service 514. For instance, the first and/or second release 510a, 510b may register with the manager service 514 when the first and/or second release 510a, 510b are downloaded, installed, provided to, execute within, or otherwise loaded into the computing environment 506. The first and/or second release 510a, 510b may register with the manager service 514 by providing the manager service 514 with a software number, version number, or other identifier associated with the respective release 510a, 510b. The manager service 514 may register the first and/or second release 510a, 510b based on the software number, version number, etc. In some embodiments, when a new version (e.g., the second release 510b) is registered, the manager service 514 may automatically enable the second release 510b (and disable the first release 510a). In some embodiments, when the first and/or second release 510a, 510b register with the manager service 514, the first and/or second release 510a, 510b may provide an indication (which may be hard-coded into the first/second release 510a, 510b, provided with the first/second release 510a, 510b when loaded into the computing environment 506, etc.) to the manager service 514 which indicates a time when the second release 510*b* is to be enabled or otherwise rolled out to the corresponding client 504.

The manager service 514 may be configured to include, store, or otherwise maintain a state of each release of a global service 510*a*, 510*b*. For instance, the manager service 514 may maintain data for identifying each release (e.g., software number, version number, etc.) and an enabled/disabled state corresponding to each release. The manager service 514 may maintain the state of each release of a global service 510*a*, 510*b* (e.g., in table form) in local memory at the client 504, for instance.

In some embodiments, each global service 510*a*, 510*b* may be designed, configured or implemented to loop poll the manager service 514. Each global service 510 may poll the manager service 514 to determine their respective current state. Each global service 510 may poll the manager service 514 at various intervals (e.g., at a predetermined time in a day, a predetermined number of times a day, an hour, a week, etc.). The manager service 514 may communicate a command corresponding to the requesting global service 510 upon receiving the poll from the global service 510. The poll may include identification information corresponding to the global service 510 (e.g., software number, version number, etc.). The manager service 514 may access the state associated with the global service 510 by cross-referencing the identification information from the poll with the data maintained by the manager service 514 for identifying particular release. The manager service 514 may identify the state corresponding to the global service 510 requesting the state. The manager service 514 may provide a command (e.g., enable/disable command) to the global service 510 corresponding to the identified state for the global service 510.

In some embodiments, the manager service 514 may provide an initial state to each global service 510 (e.g., initially enabled, initially disabled). The manager service 514 may provide the initial state when such global service 510 is loaded into the computing environment 506. The manager service 514 may then provide updated states (e.g., by providing corresponding enable/disable commands) to specific global services 510 when changes to the state are identified, determined, made, or otherwise occur, as described below.

In some embodiments, the global services 510 may not receive any API calls (or other calls, requests, etc.) other than from the manager service 514. Rather, the global services may act independently from any other calls (except for manager service 514 calls). In some embodiments, the manager service 514 may route various requests and data to various enabled global services 510. Hence, the global services 510 may only interface with manager service 514.

The manager service 514 may modify the state of the global services 510 according to various detected conditions/inputs. In some embodiments, the global services 510 may poll the manager service 514 to determine whether their corresponding state has changed. The manager service 514 may provide a command to the global services 510 corresponding to their respective status (e.g., enable command or disable command). In some embodiments, the manager service 514 may provide the state to the global service 510 (e.g., by providing the corresponding enable/disable command without the global services 510 polling the manager service 514) responsive to the state for the global service 510 changing.

The manager service 514 may identify a switch between the first release 510*a* being enabled and the second release 510*b* being enabled in a number of ways, several of which will be discussed in greater detail below. However, the present disclosure is not limited to a particular arrangement. Rather, the following examples are provided for purposes of illustration.

In some embodiments, the manager service 514 may be configured to identify when a second release of a global service 510*b* is loaded into the computing environment 506. The manager service 514 may identify when the second release of the global service 510*b* is loaded into the computing environment 506 when the second release 510*b* registers with the manager service 514, for instance. When the manager service 514 identifies the second release of the global service 510*b* is loaded into the computing environment 506, the manager service 514 may automatically set the status of the second release 510*b* to "enabled." The manager service 514 may correspondingly set the status of the first release 510*a* to "disabled" such that one instance of the global service 510 (e.g., 510*b*) is enabled within the computing environment 506. In embodiments where the global services 510 loop poll the manager service 514, the global services 510 may be enabled/disabled following the subsequent poll following the status change for the first release and second release 510*a*, 510*b* (e.g., by providing the corresponding command). In some embodiments, the manager service 514 may communicate a command instructing the first release and/or second release 510*a*, 510*b* to enable/disable when the status changes (thus bypassing the loop polling by the first/second release 510*a*, 510*b*).

In some embodiments, when the second release of a global service 510*b* is loaded into the computing environment 506, the second release 510*b* may include some indication of a time in which the second release 510*b* is to be enabled. In some instances, the scheduled enable time may be hard-coded into the second release 510*b*. In some instances, the scheduled enable time may be included with the packet delivering the second release 510*b*. The manager service 514 may automatically update the status of the second release 510*b* to "enabled" at the scheduled time corresponding to the indication. The manager service 514 may correspondingly set the status of the first release 510*a* to "disabled" such that one instance of the global service 510 (e.g., 510*b*) is enabled within the computing environment 506. In embodiments where the global services 510 loop poll the manager service 514, the global services 510 may be enabled/disabled following the subsequent poll following the status change for the first release and second release 510*a*, 510*b* (e.g., by providing the corresponding command). In some embodiments, the manager service 514 may communicate a command instructing the first release and/or second release 510*a*, 510*b* to enable/disable when the status changes (thus bypassing the loop polling by the first/second release 510*a*, 510*b*).

Such embodiments may be a rollout of new software (e.g., associated with the global service(s) 510), patches or bug fixes, improvements, etc. to old software (e.g., prior releases of global services), etc. Hence, the second release 510*b* may be an otherwise improved version of the first release 510*a* of the same global service. In some embodiments, a new release (e.g., the second release 510*b*) may itself include various bugs. For instance, where a new release is being beta-tested, the new release may require various refinements prior to a full public rollout. It may therefore be desirable to rollback from a new release to an old release. Therefore, at least two releases of a global service (e.g., first and second release 510*a*, 510*b*) are maintained in (thus executing within) the computing environment 506. The manager service 514 may rollback the global service 510 enabled in the computing environment 506 from the second release 510*b* to the first release 510*a*. The manager service 514 may revise the status for each of the first release 510*a* and second release 510*b*. The manager service may revise the status for the first release 510*a* to "enabled" and correspondingly revise the second release 510*b* to "disabled." The manager service 514 may be configured to detect instances where it is desirable to rollback to the old release in response to a number of conditions.

In some embodiments, the manager service 514 may be designed, configured or implemented to detect one or more issues with the enabled global service 510. For instance, the manager service 514 may be configured to detect, register, or otherwise identify when the global service 510 does not execute a requested action. The global service 510 may produce an error report, which may be received by the manager service 514. The error report may indicate that the global service 510 crashed while executing the requested action, was performing slowly or inefficiently while executing the requested action, etc. In some instances, the manager service 514 may poll the global service 510 to determine whether the global service 510 has completed a requested action. Where the global service 510 responds in the positive, the manager service 514 may identify no present issues with the global service 510. Where the global service 510 responds in the negative, the manager service 514 may identify a present issue with the global service 510. In still some instances, actions may be routed through the manager service 514, which may then determine when such actions are successfully completed (e.g., by the global service 510). When an action is not successfully completed, the manger service 514 may identify an issue with the global service 510. When the manager service identifies an issue with the global service 510, the manager service 514 may update the status of the enabled global service (e.g., global service 510*b*) to "disabled." The manager service 514 may correspondingly update the status of the disabled global service (e.g., the first global service 510*a*) to "enabled."

In some embodiments, the manager service 514 may receive a request from an administrator (e.g., a system administrator, a software developer, etc.) to rollback from the second release of the global service 510*b* to the first release of the global service 510*a*. In some embodiments, the global services 510 may report issues, error reports, etc. to the administrator (e.g., through an associated database or other manner in which such reports may be communicated to and accessed by the administrator). The administrator may identify one or more issues in the second release of the global service 510*b* based on various reports from the second release 510*b*. When the administrator identifies issues in the second release 510*b*, the user may communicate a signal (e.g., via various communications channels such as, for instance, the remote delivery session) to the manager service 514 to disable the second release 510*b* and enable the first release 510*a*. The manager service 514 may update the status of the enabled global service (e.g., global service 510*b*) to "disabled." The manager service 514 may correspondingly update the status of the disabled global service (e.g., the first global service 510*a*) to "enabled."

In some embodiments, the manager service 514 may receive a request for modifying the status of the global service(s) from one or more devices or components within the global services distribution system 502. The global services distribution system 502 may include a manager control agent 512. The manager control agent 512 may be or include any device or component designed, configured or implemented to control manager service(s) 514 across various client(s) 504. For instance, the manager control agent 512 may communicate with the manager service 514 across the remote delivery session for delivering the global services 510, or similar network connection and provisioning session. The manager control agent 512 may act as a master, and the manager service 514 may act as a slave. Hence, the manager control agent 512 may control the manager service 514 to execute the functions described above (e.g., the manager control agent 512 may control the manager service 514 to switch the global services 510 between enabled and disabled states, the manager control agent 512 may route requests from an administrator to the global services 510 for switching states, the manager control agent 512 may maintain the status of all global services 510, etc.).

In each embodiment, the manager service 514 may generally be designed, configured or implemented to control the state of global services 510. The manager service 514 may control the state of a global service 510 to enable the global service 510 and correspondingly disable a previous release of the global service 510. The manager service 514 may subsequently disable the enabled global service 510 and re-enable the disabled previous release of the global service 510. Such embodiments may provide for addressing and fixing various bugs, improvements, etc. to generally beta-test new releases of global services 510.

Figure 6:
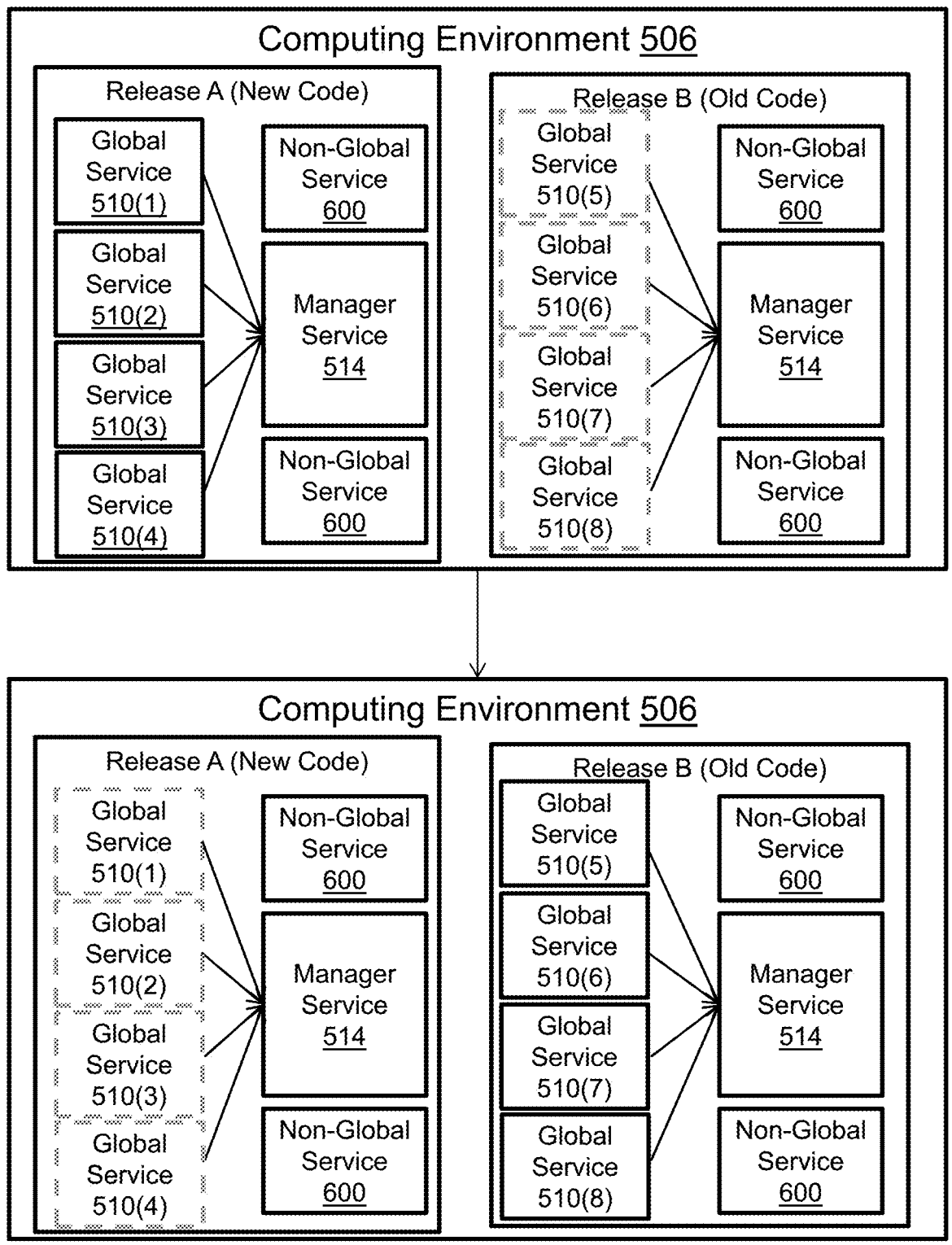
FIG. 6 is a block diagram of one example of a computing environment having releases of global services switching between enabled to disabled.

Referring now to FIG. 6, depicted is a block diagram of one example of a computing environment having releases of global services switching between enabled to disabled. Two instances of a computing environment 506 are shown—a first instance shown at the top of FIG. 6 and a second instance shown at the bottom of FIG. 6. The first instance may be temporally prior to the second instance.

The global services distributing agent 508 may distribute a first release and second release 510*a*, 510*b* (referred to in FIG. 6 as Release A and Release B) of global services. As shown in the example of FIG. 6, each release may further include non-global services 600. The non-global service(s) may execute independently of the manager service 514. The manager service 514 may be configured to control the state of the global services 510(1)-510(8). In some embodiments, global services 510(1)-510(4) may directly correlate to global service(s) 501(5)-510(8) (e.g., global service 510(5) may be a new version of global service 510(1), global service 510(6) may be a new version of global service 510(2), etc.). Global services 510(1)-510(8) may be communicably coupled to the manager service 514. The manager service 514 may be configured to enable and disable each of the global services 510. The manager service 514 may enable the new cold (e.g., the global services 510(1)-510(4) in Release A) when the new code is downloaded, loaded, provided to, etc. the computing environment 506, at a scheduled time provided by the respective global service 510, in response to an administrator request, in response to a request from a component within the global services distribution system 502, etc. Additionally, the manager service 514 may correspondingly disable the old code (e.g., the global services 510(5)-510(8) in Release B). The manager service 514 may enable the global services 510(1)-510(4) and correspondingly disable global services 510(5)-510(8), as shown in the example computing environment 506 at the top of FIG. 6.

The manager service 514 may change, modify, reconfigure, adjust, etc. the state of the global services 510(1)-510(8) responsive to various detected conditions, inputs, etc. For instance, the manager service 514 may identify, detect, etc. one of the global services 510(1)-510(8) crashing, malfunctioning, performing slowly, or one or more other issues with the global services 510(1)-510(8). The manager service 514 may identify such issues based on error reports from the global services 510(1)-510(8), instructions or commands from an administrator, such as a network administrator or software developer, instructions from a device or component at the global services distribution system 502, etc. The manager service 514 may modify the state of the global services 510(1)-510(4) in the second release (e.g., release A) to "disabled" and the manager service 514 may modify the state of the global service 510(5)-510(8) in the first release (e.g., release B) to "enabled," as shown in the bottom of FIG. 6. Hence, the manager service 514 may adaptively modify the status of the global service(s) 510 to accommodate for rollback, rollout, etc. of various global service(s) 510 and to provide for AB testing of new global service(s) 510 software with limited lag-time in the event of rollback.

Referring to FIG. 7, depicted a flow diagram of one example embodiment of a method 700 for managing releases of global services in a controlled manner. The functionalities of the method may be implemented using, or performed by, the components detailed herein in connection with FIGS. 1-6. In brief overview, a global services distribution agent may deploy a second release of a global service (705). A manager service may identify the second release is ready for use (710). The manager service may enable the second release (715). The manager may disable the first release (720). The manager service may determine the second release is to be disabled (725). The manager service may disable the second release and re-enable the first release (730).

At operation (705), a global services distribution agent may deploy a second release of a global service. In some embodiments, the global services distributing agent may deploy the second release of the global service in a computing environment for a client. The global services distributing agent may deploy the second release of the global service in a disabled state. In the disabled state, the second release may be in an idle, dormant state such that the second release of the global service may execute within the computing environment, but otherwise not service any requests or perform any functions for the client. The computing environment may include a first release of the global service which is enabled and in use. When enabled, the first release may be in an active, running state such the first release of the global service may service requests for the client, perform various functions, or otherwise act independently of the disabled global service (e.g., the second release). In some embodiments, each of the first release of the global service and the second release of the global service may be configured to be enabled and disabled.

The global services distribution agent may deploy the second release of a global service across a remote delivery session between a global services distribution system and a client. The global services distribution system may include a networking agent which establishes, creates, generates, or otherwise forms a connection between the global services distribution system and the client. The networking agent, which is sometimes referred to as an SD-WAN agent, mVPN agent, or microVPN agent, can establish or facilitate establishment of a network connection between the client and the global services distribution system (which hosts, includes, stores, etc. the global services to be delivered to the client). The networking agent can perform handshaking for a requested connection from the client, and can establish the requested connection. In some embodiments, the networking agent may establish a secure or encrypted connection. For instance, the networking agent may connect to enterprise resources (including services and network applications) for instance via a virtual private network (VPN). For example, the networking agent can establish a secure socket layer (SSL) VPN between the client and global services distribution system, which can support remote delivery or provisioning of one or more global service(s). The VPN connections, sometimes referred to as microVPN or application-specific VPN, may be specific to particular computing environments, particular clients, etc. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

In some embodiments, the networking agent may be designed, configured or implemented to form an HTTP or web-based session with the global services distribution system. The networking agent may establish a transmission control protocol (TCP) connection to, for instance, a server of the global services distribution system (e.g., a port of the server). The networking agent can exchange various commands with the server within the HTTP session in accordance with TCP. In some embodiments, the networking agent may establish a secure HTTP (e.g., HTTPS) session in a manner similar to the secure connections described above.

In these embodiments, the networking agent can form or establish the network connection between the global services distribution system and the client(s). In some embodiments, the networking agent may form or establish a secure connection (e.g., SSL VPN connection) between the global services distribution system and the client(s).

The global services distribution system may be designed, configured or implemented to initiate a provisioning session to deliver the software to the client(s) (e.g., including the global services). The global services distribution system may initiate the provisioning session within or across the network connection established by the networking agent. In some embodiments, a remote session agent may initiate the provisioning session (e.g., which may be established using Citrix high definition user experience (HDX) or independent computing architecture (ICA) protocols, or the remote desktop protocol (RDP)). The remote session agent may initiate the provisioning session in accordance with any type or form of protocols, such as RDP, Appliance Link Protocol (ALP), Remote Frame Buffer (RFB) Protocol, and ICA Protocol. Such protocols can allow delivery of software that is natively hosted at the global services distribution system to be communicated to the client.

The global services distributing agent may communicate, deliver, distribute, or otherwise provide the global services across the network connection established by the global services distribution system (e.g., the networking agent). In some embodiments, the computing environment may be delivered to the client across the same (or similar) network connection. In such embodiments, the computing environment may be a cloud based computing environment (e.g., where computing is performed remotely from the client and content is delivered to the client).

In some embodiments, the global services distributing agent may provide a first release of a global service and a second release of the global service. "Release," as used herein, refers to an iteration, instance, version, etc. of a global service. In some embodiments, the first release may be released (or provided to the client) prior to the second release. Hence, the first release may be the first instance or iteration of the global service, and the second release may be the second instance or iteration of the same global service. In some embodiments, the first release and second release may be released side-by-side (e.g., the first and second releases may be provisioned to the client at the same time). In both embodiments, the first release and second release may both be implemented in, located within, or contained within and configured to execute within the computing environment (e.g., of the client).

The second release may be or include one or more enhancements, improvements, and/or bug fixes with respect to the first release. Various software developers may modify one or more aspects of the first release to form the second release. The software developers may modify the first release in response to user feedback, crash or force close reports, error reports, latency issues, etc. The second release may address the one or more aspects identified within the first release. In some embodiments, the second release may provide for improved functionality which was previously unavailable in the first release.

In some embodiments, at least one of the first release and second release of the global service may not be configured to receive any application programming interface (API) calls other than from the manager service. In some embodiments, the global services may not receive any API calls (or other calls, requests, etc.) other than from manager service. Rather, the global services may act independently from any other calls (except for manager service calls). In some embodiments, the manager service may route various requests and data to various enabled global services. Hence, the global services may only interface with manager service.

In some embodiments, the first release and/or second release of the global service may register with the manager service. In For instance, the first and/or second release may register with the manager service when the first and/or second release are downloaded, installed, provided to, execute within, or otherwise loaded into the computing environment. The first and/or second release may register with the manager service by providing the manager service with a software number, version number, or other identifier associated with the respective release. The manager service may register the first and/or second release based on the software number, version number, etc.

At operation (710), a manager service may identify the second release is ready for use. In some embodiments, the manager service may identify that the second release of the global service has passed one or more checks and is ready to be enabled for use in the computing environment. In some embodiments, the manager service may receive one or more commands or instructions indicating the second release has passed one or more checks and is ready to be enabled for use. For instance, the manager service may receive the one or more commands or instructions from an administrator, such as a network administrator, a software developer, etc. The administrator may perform the one or more checks on the second release. In other instances, the manager service may receive the one or more commands or instructions from another device or component in the global services distribution system, such as a manager control agent. The manager control agent may provide an indication which indicates the second release has passed the one or more checks. The manager control agent may receive such an indication from the administrator following the administrator testing, checking, or otherwise verifying/validating the second release. The second release may pass the one or more checks corresponding to an alpha-testing. Hence, the manager service may identify that the second release of the global service has passed alpha-testing and is ready to be enabled for use in the computing environment (e.g., beta-testing).

In embodiments where one of the first release of the global service or second release of the global service registers with the manager service, the first and/or second release may poll the manager service for one of an enable or disable command. Each global service may poll the manager service to determine their respective current state. Each global service may poll the manager service at various intervals (e.g., at a predetermined time in a day, a predetermined number of times a day, an hour, a week, etc.). The manager service may communicate a command corresponding to the requesting global service upon receiving the poll from the global service. The poll may include identification information corresponding to the global service (e.g., software number, version number, etc.). The manager service may access the state associated with the global service by cross-referencing the identification information from the poll with the data maintained by the manager service for identifying particular release. The manager service may identify the state corresponding to the global service requesting the state. The manager service may provide a command (e.g., enable/disable) to the global service corresponding to the identified state for the global service.

At operation (715), the manager service may enable the second release. In some embodiments, the manager service may enable use of the second release of the global service in the computing environment. The manager service may communicate a command to enable the second release responsive to identifying the state of the second release is "enabled" (e.g., in response to the second release polling the manager service or in response to the state changing). The manager service may communicate the command to the second release, which may cause the second command to be enabled. In an enabled state, the second release may service requests and perform functions/actions within the computing environment. The second release may be enabled from a disabled state where the second release ignores, disregards, or otherwise does not perform or execute any actions within the computing environment. The second release may be in the disabled state until the second release receives the command from the manager service.

At operation (720), the manager service may disable the first release. In some embodiments, the manager service may disable use of the first global service in the computing environment while maintaining execution of the first release of the global service in the computing environment. Hence, the first release may be disabled, but still be maintained within (and therefore executing within) the computing environment. The manager service may communicate a command to disable the first release responsive to identifying the state of the first release is "disabled" (e.g., in response to the first release polling the manager service or in response to the state changing). The manager service may communicate the command to the first release, which may cause the first command to be disabled. The first release may be disabled such that the first release ignores, disregards, or otherwise does not perform or execute any actions within the computing environment. The first release may still be maintained within the computing environment and, therefore, execute within the computing environment. The first release, however, may not execute any functions or perform any actions (other than, for instance, loop polling the manager service for an enable command).

In some embodiments, the manager service may disable the first release of the global service responsive to enabling the second release of the global service. Hence, the manager service may perform operation (715) and (720) simultaneously or sequentially. In these embodiments, the manager service may maintain one instance (or release) of the global service enabled and executing within the computing environment (e.g., either the first release or second release of the global service).

At operation (725), the manager service may determine the second release is to be disabled. In some embodiments, the manager service may determine that the second release of the global service has one or more issues and is to be disabled. The manager service may determine that the second release of the global service has one or more issues in a number of ways. In some instances, the manager service may detect, register, or otherwise identify when the second release of the global service does not execute a requested action. The second release of the global service may produce an error report, which may be received by the manager service. The error report may indicate that the second release of the global service crashed while executing the requested action, was performing slowly or inefficiently while executing the requested action, etc. In some instances, the manager service may poll the second release of the global service to determine whether the second release has completed a requested action. Where the second release of the global service responds in the positive, the manager service may identify no present issues with the second release. Where the second release of the global service responds in the negative, the manager service may identify a present issue with the second release. In still some instances, actions for the second release of the global service may be routed through the manager service, which may then determine when such actions are successfully completed (e.g., by the second release of the global service). When an action is not successfully completed, the manger service may identify an issue with the second release of the global service. In some embodiments, the manager service may determine that the second release of the global service has one or more issues based on data received from another party or component, such as the administrator or manager control agent described above with respect to operation (710). The administrator (through the manager control agent or directly from the administrator to the manager service) may communicate an indication, instruction, or other identification which indicates that the second release of the global service includes the one or more issues. The administrator may receive error reports from various clients, perform testing which reveals the one or more issues, receive feedback from various clients, etc. The administrator may flag such issues for disabling the second release. The manager service may receive an identification or indication of such issues, and the manager service may determine that the second release is to be disabled.

In some embodiments, the manager service may determine (or further determine) that the global service is to be rolled back to the first release of the global service from the second release of the global service. Responsive to determining that the second release of the global service has one or more issues and is to be disabled, the manager service may determine that the global service is to be rolled back. In such embodiments, the manager service may maintain one instance (or release) of the global service active and executing within the computing environment.

At operation (730), the manager service may disable the second release and re-enable the first release. In some embodiments, the manager service may disable use of the second release of the global service in the computing environment and may re-enable use of the first release of the global service. The manager service may disable use of the second release of the global service in a manner similar to the manager service disabling use of the first release at operation (720). The manager service may re-enable use of the first release of the global service in a manner similar to the manager service enabling use of the second release at operation (715). Hence, operation (730) may be similar to operations (715) and (720).

In some embodiments, the manager service may maintain the disabled second release of the global service executing and idle in the computing environment. Hence, similar to the first release following operation (720), the second release may be maintained within the computing environment (and, therefore, executing within the computing environment). The second release of the global service may be maintained within the computing environment such that, should the issue(s) (e.g., identified at operation (725)) be resolved or be determined to be non-issues, the second release may be re-enabled (and first release be correspondingly disabled). Such embodiments provide for adaptive, quick switching between releases of global services. Such embodiments may eliminate or lessen the likelihood of downtime from pushing new versions (or rollback to an old version) to the client for installing, executing, or otherwise providing or provisioning within the computing environment. Rather, such embodiments maintain at least two releases of global services for quickly switching between one and the other.

In some embodiments, one or more non-global services executing in the computing environment continue to process user requests received when the first release of the global service was enabled. Non-global services may be or include services executing in a computing environment which may be specific to a particular client or subset of clients. In some embodiments, non-global services may execute in the background (e.g., similar to global services). In some embodiments, non-global services may execute in the foreground (e.g., some non-global service(s) may include various user interface aspects and designed to interact with a user). Non-global service(s) may be designed, configured or implemented to execute and process user requests without regard to the status of global service(s). Hence, non-global service(s) may operate or are configured to operate independently of global services. In some embodiments, non-global service(s) may be or include local services (e.g., services which may execute locally outside of the computing environment, or services which may execute within the computing environment but specific to particular clients or client requirements within a given client network).

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method for managing releases of global services in a controlled manner, the method comprising:
    deploying, in a computing environment, a second release of a global service in a disabled state at a second time instance, the computing environment having a first release of the global service deployed at a first time instance and enabled at the second time instance, each of the first release of the global service and the second release of the global service executing in the computing environment and polling a manager service for one of an enable or disable command responsive to deployment, wherein requests for the computing environment are routed to the first release of the global service responsive to the first release of the global service being enabled;
    maintaining, by the manager service, in one or more data structures, states of the first release of the global service and the second release of the global service;
    updating, by the manager service, in the one or more data structures, a first state of the first release to a disabled state and a second state of the second release to an enabled state;
    receiving, by the manager service, a first poll to determine the first state from the first release of the global service while the first release is executing and enabled;
    sending, by the manager service, to the first release of the global service responsive to receiving the first poll, a first disable command based on the first state in the one or more data structures, the first disable command to disable the first release of the global service while maintaining execution of the first release in the computing environment;
    receiving, by the manager service, a second poll to determine the second state from the second release of the global service while the second release is executing and disabled;
    sending, by the manager service, to the second release of the global service responsive to receiving the second poll, a first enable command based on the second state in the one or more data structures, the first enable command to enable the second release of the global service in the computing environment;
    updating, by the manager service responsive to the second release having one or more issues and is to be disabled, in the one or more data structures, the first state of the first release to an enabled state and the second state of the second release to a disabled state;
    receiving, by the manager service, a third poll to determine the first state from the first release of the global service while the first release is executing and disabled;
    sending, by the manager service, to the first release of the global service responsive to receiving the third poll, a second enable command based on the first state in the one or more data structures, the second enable command to enable the first release of the global service;
    receiving, by the manager service, a fourth poll to determine the second state from the second release of the global service while the second release is executing and enabled; and
    sending, by the manager service, to the second release of the global service responsive to receiving the fourth poll, a second disable command based on the second state in the one or more data structures, the second disable command to disable the second release of the global service in the computing environment.

2. The method of claim 1, wherein the computing environment comprises a cloud based computing environment.

3. The method of claim 1, wherein the second release of the global service comprises one of maintenance fixes or enhancements to the first release of the global service.

4. The method of claim 1, wherein one of the first release of the global service and the second release of the global service is not configured to receive any application programming interface (API) calls other than from the manager service.

5. The method of claim 1, further comprises registering, by one of the first release of the global service or the second release of the global service, with the manager service.

6. The method of claim 5, wherein the first release of the global service and the second release of the global service poll the manager service to determine the first and second states responsive to registering with the manager service.

7. The method of claim 1, wherein disabling use of the second release further comprises maintaining the disabled second release of the global service executing and idle in the computing environment such that the disabled second release polls the manager service while being disabled.

8. The method of claim 7, wherein one or more non-global services executing in the computing environment continue to process user requests received when the first release of the global service was enabled.

9. The method of claim 1, wherein determining that the second release of the global service has one or more issues and is to be disabled further comprises determining that the global service is to be rolled back to the first release of the global service from the second release of the global service.

10. The method of claim 1, wherein the manager service updates the first state in the one or more data structures to disable the first release of the global service responsive updating the second state in the one or more data structures to enable the second release of the global service.

11. A system for managing releases of global services in a controlled manner, the system comprising:
one or more processors configured to establish a computing environment, the computing environment comprising a first release of a global service and a second release of the global service, wherein the first release is deployed at a first time instance and the second release is deployed at a second time instance, each of the first release of the global service and the second release of the global service executing in the computing environment and polling a manager service for one of an enable or disable command responsive to deployment, wherein requests for the computing environment are routed to the first release of the global service responsive to the first release of the global service being enabled;
wherein the first release of the global service is enabled at the second time instance and the second release of the global service is disabled at the second time instance; and
the manager service executable in the computing environment and configured to:
maintain, in one or more data structures, states of the first release of the global service and the second release of the global service;
update, in the one or more data structures, subsequent to the second time instance, a first state of the first release to a disabled state and a second state of the second release to an enabled state;
receive a first poll to determine the first state from the first release of the global service while the first release is executing and enabled;
send, to the first release of the global service responsive to receiving the first poll, a first disable command based on the first state in the one or more data structures, the disable command to disable the first release of the global service while maintaining execution of the first release in the computing environment;
receive a second poll to determine the second state from the second release of the global service while the second release is executing and disabled;
send, to the second release of the global service responsive to receiving the second poll, a first enable command based on the second state in the one or more data structures, the first enable command to enable the second release of the global service in the computing environment;
update, in the one or more data structures responsive to the second release having one or more issues and is to be disabled, the first state of the first release to an enabled state and the second state of the second release to a disabled state;
receive a third poll to determine the first state from the first release of the global service while the first release is executing and disabled;
send, to the first release of the global service responsive to receiving the third poll, a second enable command based on the first state in the one or more data structures, the second enable command to enable the first release of the global service;
receive a fourth poll to determine the second state from the second release of the global service while the second release is executing and enabled; and
send, to the second release of the global service responsive to receiving the fourth poll, a second disable command based on the second state in the one or more data structures, the second disable command to disable the second release of the global service in the computing environment.

12. The system of claim 11, wherein the computing environment comprises a cloud based computing environment.

13. The system of claim 11, wherein the second release of the global service comprises one of maintenance fixes or enhancements to the first release of the global service.

14. The system of claim 11, wherein one of the first release of the global service and the second release of the global service is not configured to receive any application programming interface (API) calls other than from the manager service.

15. The system of claim 11, wherein one of the first release of the global service or the second release of the global service is further configured to register with the manager service.

16. The system of claim 15, wherein the first release of the global service and the second release of the global service are configured to poll the manager service to determine the first and second states responsive to registering with the manager service.

17. The system of claim 11, wherein the disabled second release of the global service is maintained executing and idle in the computing environment such that the disabled second release of the global service polls the manager service while being disabled.

18. The system of claim 17, wherein one or more non-global services are configured in the computing environment to continue to process user requests received when the first release of the global service was enabled.

19. The system of claim 11, wherein the manager service is further configured to rollback the global service to the first release from the second release.

20. The system of claim 11, wherein the manager service is further configured to update the first state in the one or more data structures to disable the first release of the global service responsive to updating the second state in the one or more data structures to enable the second release of the global service.

21. A non-transitory computer readable medium storing instructions that, when executed by one or more processors, cause the one or more processors to:
deploy, in a computing environment, a second release of a global service in a disabled state at a second time instance, the computing environment having a first release of the global service deployed at a first time instance and enabled at the second time instance, each of the first release of the global service and the second release of the global service executing in the computing environment and polling a manager service for one of an enable or disable command responsive to deployment, wherein requests for the computing environment are routed to the first release of the global service responsive to the first release of the global service being enabled;

maintain, by the manager service, in one or more data structures, states of the first release of the global service and the second release of the global service;

update, by the manager service, in the one or more data structures, a first state of the first release to a disabled state and a second state of the second release to an enabled state;

receive, by the manager service, a first poll to determine the first state from the first release of the global service while the first release is executing and enabled;

send, by the manager service, to the first release of the global service responsive to receiving the first poll, a first disable command based on the first state in the one or more data structures, the first disable command to disable the first release of the global service while maintaining execution of the first release in the computing environment;

receive, by the manager service, a second poll to determine the second state from the second release of the global service while the second release is executing and disabled;

send, by the manager service, to the second release of the global service responsive to receiving the second poll, a first enable command based on the second state in the one or more data structures, the first enable command to enable the second release of the global service in the computing environment;

update, by the manager service, in the one or more data structures responsive to the second release having one or more issues and is to be disabled, the first state of the first release to an enabled state and the second state of the second release to a disabled state;

receive, by the manager service, a third poll to determine the first state from the first release of the global service while the first release is executing and disabled;

send, by the manager service, to the first release of the global service responsive to receiving the third poll, a second enable command based on the first state in the one or more data structures, the second enable command to enable the first release of the global service;

receive, by the manager service, a fourth poll to determine the second state from the second release of the global service while the second release is executing and enabled; and send, by the manager service, to the second release of the global service responsive to receiving the fourth poll, a second disable command based on the second state in the one or more data structures, the second disable command to disable the second release of the global service in the computing environment.

* * * * *